US012626520B2

(12) United States Patent
Iken et al.

(10) Patent No.: US 12,626,520 B2
(45) Date of Patent: May 12, 2026

(54) DETECTION OF INTERSECTION POINTS OF ROAD MARKING LINES

(71) Applicant: VOLKSWAGEN AKTIENGESELLSCHAFT, Wolfsburg (DE)

(72) Inventors: Timo Iken, Wolfsburg (DE); Stefan Wappler, Berlin (DE); Roland Kube, Schwülper (DE); Niklas Koch, Tappenbeck (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 377 days.

(21) Appl. No.: 18/559,505

(22) PCT Filed: Apr. 29, 2022

(86) PCT No.: PCT/EP2022/061454
§ 371 (c)(1),
(2) Date: Nov. 7, 2023

(87) PCT Pub. No.: WO2022/233721
PCT Pub. Date: Nov. 10, 2022

(65) Prior Publication Data
US 2024/0242511 A1 Jul. 18, 2024

(30) Foreign Application Priority Data
May 7, 2021 (DE) ..................... 10 2021 204 639.8

(51) Int. Cl.
*G06V 20/56* (2022.01)
*G06V 10/22* (2022.01)
(Continued)

(52) U.S. Cl.
CPC .......... *G06V 20/588* (2022.01); *G06V 10/225* (2022.01); *G06V 10/44* (2022.01); *G06V 20/586* (2022.01)

(58) Field of Classification Search
CPC .. G06V 20/588; G06V 20/586; G06V 10/225; G06V 10/44; G06V 10/48; G06V 10/753
See application file for complete search history.

(56) References Cited

U.S. PATENT DOCUMENTS

| | | | |
|---|---|---|---|
| 7,440,636 B2 | 10/2008 | Bober et al. | |
| 9,467,645 B2 | 10/2016 | Yoon et al. | |
| (Continued) | | | |

FOREIGN PATENT DOCUMENTS

| | | |
|---|---|---|
| CN | 108266033 A | 7/2018 |
| CN | 109649384 A | 4/2019 |
| (Continued) | | |

OTHER PUBLICATIONS

Suhr, Jae Kyu, and Ho Gi Jung. "Sensor fusion-based vacant parking slot detection and tracking." IEEE transactions on intelligent transportation systems 15, No. 1 (2013): 21-36. (Year: 2013).*
(Continued)

*Primary Examiner* — Carol W Chan
(74) *Attorney, Agent, or Firm* — BARNES & THORNBURG LLP

(57) ABSTRACT

A method for detecting at least one intersection point of road marking lines, wherein a computing unit of a transportation vehicle receives a camera image and identifies a first road marking line based on the camera image. Using the computing unit, a search region is automatically defined in an environment of the first road marking line, and an automatic search limited to the search region is performed. At least one
(Continued)

intersection point of the first road marking line with at least a second road marking line is identified as the result of the search.

22 Claims, 3 Drawing Sheets

(51) Int. Cl.
*G06V 10/44* (2022.01)
*G06V 20/58* (2022.01)

(56) References Cited

U.S. PATENT DOCUMENTS

| | | | | |
|---|---|---|---|---|
| 2011/0052079 A1* | 3/2011 | Tamura | | G06V 20/588 |
| | | | | 382/199 |
| 2013/0265429 A1* | 10/2013 | Yoon | | G06V 10/44 |
| | | | | 348/148 |
| 2019/0266419 A1* | 8/2019 | Schack | | G05D 1/0246 |
| 2020/0097751 A1 | 3/2020 | Xavier da Silveira | | |

FOREIGN PATENT DOCUMENTS

| | | | | | |
|---|---|---|---|---|---|
| CN | 111862673 A | * | 10/2020 | .......... | G06V 20/586 |
| DE | 102018131106 A1 | | 6/2020 | | |
| JP | 2004034946 A | * | 2/2004 | | |
| JP | 2013186660 A | | 9/2013 | | |
| JP | 2014186515 A | | 10/2014 | | |
| KR | 20050043006 A | | 5/2005 | | |
| KR | 20090091578 A | | 8/2009 | | |
| KR | 20130128162 A | | 11/2013 | | |
| WO | 2018198512 A1 | | 11/2018 | | |

OTHER PUBLICATIONS

Translated version of JP 2004034946 (Year: 2004).*

Suhr, Jae Kyu, and Ho Gi Jung. "A universal vacant parking slot recognition system using sensors mounted on off-the-shelf vehicles." Sensors 18, No. 4 (2018): 1213. (Year: 2018).*

Zhang, Lin, Xiyuan Li, Junhao Huang, Ying Shen, and Dongqing Wang. "Vision-based parking-slot detection: a benchmark and a learning-based approach." Symmetry 10, No. 3 (2018): 64. (Year: 2018).*

Jung; Semi-automatic parking slot marking recognition for intelligent parking assist systems; The Journal of Engineering; Jan. 2014; vol. 2014, Issue 1; pp. 8-15.

Kim et al.; Vacant Parking Slot Recognition Method for Practical Autonomous Valet Parking System Using around View Image; Symmetry; Oct. 19, 2022; No. 12; 13 pages.

Suhr et al.; Automatic Parking Space Detection and Tracking for Underground and Indoor Environments; IEEE; Transactions on Industrial Electronics; Sep. 2016; vol. 63, No. 9; pp. 5687-5698.

Wang et al.; Automatic Parking Based on a Bird's Eye View Vision System; Advances in Mechanical Engineering; Jan. 1, 2014; vol. 2014; Article ID 847406; 13 pages.

International Search Report; International Patent Application No. PCT/EP2022/061454; Jul. 15, 2022.

Office Action; Chinese Patent Application No. 202280033501.2 dated Dec. 26, 2025.

* cited by examiner

DETECTION OF INTERSECTION POINTS OF ROAD MARKING LINES

PRIORITY CLAIM

This patent application is a U.S. National Phase of International Patent Application No. PCT/EP2022/061454, filed 29 Apr. 2022, which claims priority to German Patent Application No. 10 2021 204 639.8, filed 7 May 2021, the disclosures of which are incorporated herein by reference in their entireties.

SUMMARY

Illustrative embodiments relate to a method for detecting at least one intersection point of road marking lines, wherein by use of a computing unit of a transportation vehicle, at least one camera image depicting a road surface in an environment of the transportation vehicle is received from a camera system of the transportation vehicle, and a first road marking line is identified on the basis of the at least one camera image. Illustrative embodiments also relate to a corresponding method for the localization of a transportation vehicle, a method for the at least partially automatic control of a transportation vehicle, a detection system for a transportation vehicle, an electronic vehicle control system, a transportation vehicle, and a computer program product.

BRIEF DESCRIPTION OF THE DRAWINGS

Exemplary embodiments are described below with reference to the figures, in which.

DETAILED DESCRIPTION

Figure 1:
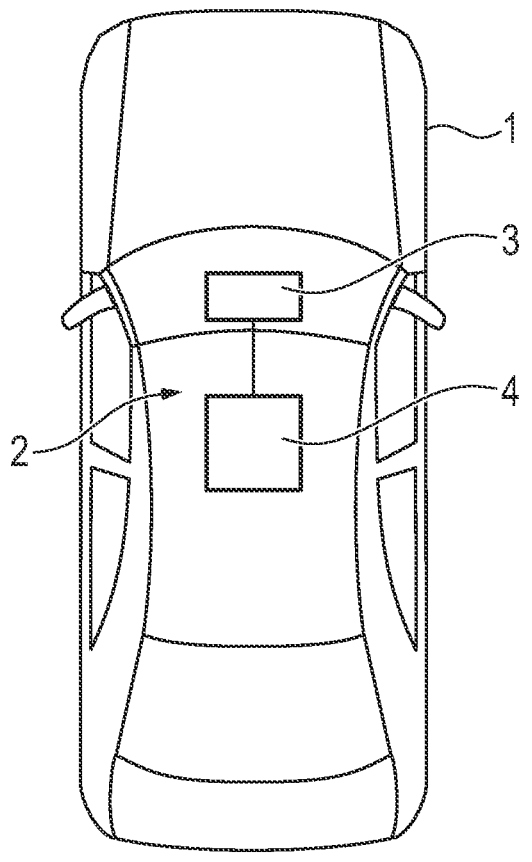
FIG. 1 shows a schematic illustration of a transportation vehicle with an exemplary embodiment of a disclosed detection system.

Driver assistance systems and systems for autonomous driving may use methods for the self-localization of the transportation vehicle, for example, for automated trajectory planning and the like. Many approaches for localization are based on the detection of landmarks in combination with a map comparison. Road marking lines are suitable for this, for example, particularly in applications for automated or partially automated parking. It is beneficial, in particular, to use intersection points of road marking lines for localization purposes.

The document DE 10 2018 131 106 A1 describes a method for recognizing a parking region. That involves receiving from a camera of the transportation vehicle an image describing a parking area marking, in which image a corner element and a line element are recognized. The corner element and the line element are entered as separate representations in a digital environment map.

Disclosed embodiments specify a possibility to enable intersection points of road markings to be detected with lower computational complexity for computation resources of the transportation vehicle.

The disclosed embodiments are based on the concept of a multistage detection in which, firstly, a road marking line is identified and, in an automatically generated search region around the road marking line, an automatic search is carried out to identify an intersection point with a further road marking line.

In accordance with at least one exemplary embodiment, a method for detecting at least one intersection point of road marking lines, in particular, of a first road marking line and a second road marking line, is specified. In this case, by use of a computing unit of a transportation vehicle, at least one camera image depicting a road surface in an environment of the transportation vehicle is received from a camera system of the transportation vehicle. By use of the computing unit, a first road marking line is automatically identified on the basis of the at least one camera image and, by the computing unit, a search region is automatically determined in a predefined environment of the first road marking line. By use of the computing unit, an automatic search restricted to the search region is carried out, and at least one intersection point of the first road marking line with at least one second road marking line is identified as the result of the search.

The camera system can include one or more cameras mounted optionally at different positions of the transportation vehicle. The at least one camera image can be exactly one camera image, a plurality of camera images, or a combined image from different cameras. In this case, the output data of the camera system can be communicated to the computing unit without being changed, or can be partially preprocessed by the camera system itself before they are communicated to the computing unit. Alternatively or additionally, the computing unit can preprocess the data obtained from the camera system to generate the at least one camera image. The preprocessing by the camera system and/or the computing unit can include, for example, an equalization, a perspective transformation, a masking and/or a filtering and so on. The search region is thus a region or excerpt of the at least one camera image.

The fact that the search region is determined in the predefined environment of the first road marking line can be understood, for example, such that the corresponding rules for the construction of the search region are predefined for a given first road marking line. In particular, the position and orientation and also the size of the search region are not predefined, and are determined automatically on the basis of the identified first road marking line by the computing unit.

A computing unit can be understood to mean a data processing device; the computing unit can thus process data for carrying out computation operations. These optionally also include operations for carrying out indexed accesses to a data structure, for example, a look-up table, LUT.

The computing unit can contain a computer, a microcontroller or an integrated circuit, for example, an application-specific integrated circuit, ASIC, a field programmable gate array, FPGA, and/or a system on a chip, SoC. The computing unit can also contain a processor, for example, a microprocessor, a central processing unit, CPU, a graphics processing unit, GPU, a signal processor, in particular, a digital signal processor, DSP, and/or an electronic control unit, ECU. The computing unit can also include a physical or virtual interconnection of computers or other units from among those mentioned. In this case, the computing unit can also be referred to as a computing system, for example. In various exemplary embodiments, the computing unit includes one or more hardware and/or software interfaces and/or one or more storage units.

The automatic search in the search region can include, for example, implementing a feature recognition algorithm for recognizing corners or other characteristic features of intersecting road marking lines. The fact that the search is restricted to the search region means, in particular, that outside the search region no intersection points are identified or no corresponding features are identified by the feature recognition algorithm. However, this does not preclude carrying out a further search in a further method operation, which further search can be restricted to a further search region that does not correspond to the search region of the search.

The first road marking line can be, for example, a substantially straight road marking line or a road marking line that is substantially straight in sections. However, such a road marking line is clearly not an exact one-dimensional line, but rather has an at least two-dimensional extent on the road surface. The straight road marking line can, for example, substantially correspond to a rectangle or a rectangle having rounded corners or edges. The second road marking line, too, can be a substantially straight road marking line or a road marking line that is substantially straight in sections. However, the second road marking line can also have a curvature, in particular, also in an environment of the intersection point with the first road marking line.

By use of the disclosed method and, in particular, the two-stage detection of the intersection points and the attendant restriction of the search to the search region, the computational complexity and thus the computation time can be reduced. This is of crucial importance in the context of automatic or partially automatic driving functions, since, firstly, the computation resources of embedded systems used there are limited and, secondly, it is necessary to carry out a multiplicity of parallel computation tasks based on further sensor outputs in real time for successive sensor frames, in particular, camera frames, to be able to ensure that the automatic or partially automatic driving function is carried out reliably and safely.

The described search restricted to the search region additionally avoids the need to carry out a geometric calculation of intersection points of a plurality of lines in the field of view of the camera. Firstly, such an intersection point calculation would potentially be highly prone to errors since even small errors in the relative angle of the lines with respect to one another greatly affect the errors in the calculated intersection points. In addition, many lines corresponding in part to segments of worn or dirty road marking lines may be identified in the field of view of the camera, and so a multiplicity of lines would have to be compared with a multiplicity of other lines for the geometric calculation, which results in an increased computational complexity. Computational complexity and computation time are likewise saved by the restriction to the search region.

In various exemplary embodiments of the disclosed method, for example, all the road marking lines detected in the field of view of the camera system can firstly be coarsely clustered, in which case, for example, lines with substantially identical orientation are attached to one another or join together. The first road marking line can then be defined as that clustered line having the longest total length or as one of the clustered lines having a total length which is greater than a predefined minimum value.

It is also possible to impose further minimum requirements on the first road marking line to identify the latter as such. The further minimum requirements can concern the length or a color, for example.

In accordance with at least one exemplary embodiment, for identifying the first road marking line, a line recognition algorithm for recognizing straight or substantially straight lines is applied to image data dependent on the at least one camera image.

The image data dependent on the at least one camera image can be the at least one camera image itself or a modified or preprocessed version of the at least one camera image.

Such disclosed embodiments have the benefit that efficient line detection algorithms for straight lines are known and, as a result, the identification of the first road marking line can take place faster than if, for example, the intersection points were searched for as corners or the like in at least one camera image in a single detection operation.

The line recognition algorithm can include, for example, a random sample consensus algorithm, RANSAC, and/or a Hough transformation algorithm.

In accordance with at least one exemplary embodiment, for carrying out the automatic search, a feature recognition algorithm for recognizing corners and/or for recognizing other predefined characteristic intersection point descriptors is applied to the search region.

In other words, the second road marking line is not explicitly ascertained as a straight line or the like, rather the at least one intersection point is identified on the basis of the corners found in the search region, or other intersection point descriptors. This affords a particularly robust and time-efficient possibility for detecting the intersection points. The probability of false positive detections of intersection points can be further reduced in this way.

The predefined characteristic intersection point descriptors can be, for example, features in the search region which are typical of intersecting road marking lines, for example, straight lines or segments that are at right angles to one another or form some other predetermined angle, and so on.

In accordance with at least one exemplary embodiment, the feature recognition algorithm includes a Harris detector algorithm, which may, for example, also be referred to as a Harris corner detector.

In accordance with at least one exemplary embodiment, a multiplicity of potential intersection points of the first road marking line with the at least one second road marking line are identified as the result of the search. The at least one intersection point is selected from the multiplicity of potential intersection points depending on at least one predefined rule, in particular, by the computing unit.

In other words, the potential intersection points are filtered to identify the at least one intersection point. The filtering may also be understood as validation, for example. The filtering or validation can be carried out, for example, on the basis of digital map data or other context knowledge.

In accordance with at least one exemplary embodiment, the at least one rule includes a first rule concerning a target distance between two of the potential intersection points.

By way of example, the expected width of the second and/or first road marking line may be known from the map data or from other information sources. Accordingly, the target distance between two actual intersection points can also be determined by way of the width. If a pair of potential intersection points are at the target distance or approximately the target distance from one another, then the probability of both potential intersection points being actual intersection points of the first road marking line with the at least one second road marking line is comparatively high. The probability of false positive detections can thus be reduced.

In accordance with at least one exemplary embodiment, the at least one rule includes a second rule concerning an angle formed between the first road marking line and a straight line connecting two of the potential intersection points to one another.

Particularly if the first road marking line is a substantially straight road marking line, then the connecting straight line between two different intersection points with the at least one second road marking line is at least approximately parallel to the first road marking line. By contrast, if the angle formed between the straight line connecting the two potential intersection points to one another and the first road marking line is greater than zero or greater than a predefined tolerance value, then it can be deduced from this that at any rate both potential intersection points do not correspond to actual intersection points of the first road marking line with the at least one second road marking line. The probability of false positive detections can be further reduced in this way.

In accordance with a further exemplary embodiment, a method for the localization, in particular, for the self-localization, of a transportation vehicle is specified. At least one camera image depicting a road surface in an environment of the transportation vehicle is generated by a camera system of the transportation vehicle. By use of a computing unit of the transportation vehicle, a disclosed method for detecting at least one intersection point of road marking lines is carried out. By use of the computing unit, the at least one intersection point is compared with a predefined digital map and a position of the transportation vehicle in a predefined reference coordinate system is determined on the basis of a result of the comparison.

In other words, the at least one intersection point is used as a landmark for the self-localization of the transportation vehicle.

In accordance with a further exemplary embodiment, a method for the at least partially automatic control of a transportation vehicle is specified. In this case, a disclosed method for the localization of the transportation vehicle is carried out, and at least one control signal for the at least partially automatic control of the transportation vehicle is generated, in particular, by a control unit of the transportation vehicle, depending on the position of the transportation vehicle in the reference coordinate system.

The at least one control signal can be communicated to one or more actuators of the transportation vehicle to cause same to control the transportation vehicle accordingly.

By way of example, the transportation vehicle can comprise an electronic vehicle control system including the computing unit and optionally the control unit and also the camera system. In this case, the computing unit can be part of the control unit or vice versa. The computing unit and the control unit can also be embodied independently of one another.

In accordance with at least one exemplary embodiment of the method for at least partially automatic control, the transportation vehicle is at least partially automatically controlled depending on the at least one control signal, in particular, by the one or more actuators. By way of example, the at least partially automatic control can be part of an at least partially automatic parking process or process for parking of the transportation vehicle.

Here and hereinafter, an electronic vehicle control system can be understood to mean an electronic system that is configured to drive or to control the transportation vehicle fully automatically or fully autonomously, in particular, without a driver needing to intervene in the control. The transportation vehicle or the electronic vehicle control system in this case performs all necessary functions, such as any necessary steering, braking and/or acceleration maneuvers, monitoring and detecting road traffic and the associated necessary reactions, autonomously and fully automatically. The electronic vehicle control system can be used to implement a fully automatic or fully autonomous driving mode of the transportation vehicle in accordance with Level 5 of the SAE J3016 classification. An electronic vehicle control system can also be understood to mean an advanced driver assistance system, ADAS, which assists the driver during partially automated or partially autonomous driving of the transportation vehicle. The electronic vehicle control system can be used to implement a partially automated or partially autonomous driving mode of the transportation vehicle in accordance with one of Levels 1 to 4 of the SAE J3016 classification. Here and hereinafter, "SAE J3016" refers to the corresponding standard in the version dated June 2018.

The at least partially automatic vehicle control can therefore include driving the transportation vehicle in accordance with a fully automatic or fully autonomous driving mode of Level 5 in accordance with SAE J3016. The at least partially automatic vehicle control can also include driving the transportation vehicle in accordance with a partially automated or partially autonomous driving mode in accordance with one of Levels 1 to 4 in accordance with SAE J3016.

In accordance with a further exemplary embodiment, a detection system for a transportation vehicle for detecting at least one intersection point of road marking lines is specified. The detection system comprises a camera system configured to generate at least one camera image depicting a road surface in an environment of the camera system. In particular, if the camera system is mounted on the transportation vehicle, the environment of the camera system is an environment of the transportation vehicle. The detection system comprises a computing unit configured to automatically identify a first road marking line on the basis of the at least one camera image. The computing unit is configured automatically to determine a search region in a predefined environment of the first road marking line, and to carry out an automatic search restricted to the search region. The computing unit is configured to identify at least one intersection point of the first road marking line with at least one second road marking line as the result of the search.

In accordance with at least one exemplary embodiment of the detection system, the computing unit is configured to compare the at least one intersection point with a predefined digital map and to determine a position of the transportation vehicle in a predefined reference coordinate system on the basis of a result of the comparison.

In such disclosed embodiments, the detection system may also be referred to as a localization system for a transportation vehicle, in particular, as a system for self-localization for a transportation vehicle.

The digital map can be stored on a storage unit of the transportation vehicle or of the detection system, in particular, of the computing unit. The digital map can also be stored completely or partially on an external computer system, for example, a server computer system.

In accordance with a further exemplary embodiment, an electronic vehicle control system for a transportation vehicle is specified, comprising a disclosed detection system, in particular, a disclosed localization system. The electronic vehicle control system comprises a control unit configured to generate at least one control signal for the at least partially automatic control of the transportation vehicle depending on the position of the transportation vehicle in the reference coordinate system.

The at least one control signal can be provided to at least one actuator of the transportation vehicle to realize the at least partially automatic control of the transportation vehicle.

In accordance with a further exemplary embodiment, a transportation vehicle is specified, comprising a detection system, a localization system or an exemplary electronic vehicle control system.

In accordance with a further exemplary embodiment, a first computer program comprising first instructions is specified. Upon the execution of the first computer program or the first instructions by a computer system, in particular, by a disclosed detection system, for example, by the computing unit thereof, the instructions cause the computer system to carry out a disclosed method for detecting at least one intersection point of road marking lines.

In accordance with a further exemplary embodiment, a second computer program comprising second instructions is specified. Upon the execution of the first computer program or the first instructions by a disclosed localization system, in particular, by the computing unit thereof, the instructions cause the localization system to carry out a disclosed method for the localization of a transportation vehicle.

In accordance with a further exemplary embodiment, a third computer program comprising third instructions is specified. Upon the execution of the third computer program or the third instructions by an exemplary electronic vehicle control system, in particular, by the computing unit thereof, the instructions cause the electronic vehicle control system to carry out a disclosed method for the at least partially automatic control of a transportation vehicle.

In accordance with a further exemplary embodiment, a computer-readable storage medium is specified, which stores a first computer program, a second computer program and/or a third disclosed computer program.

The disclosed computer programs and also the disclosed computer-readable storage medium can be regarded as respective computer program products comprising the corresponding instructions.

Further features of the disclosure are evident from the claims, the figures and the description of the figures. The features and combinations of features mentioned above in the description and also the features and combinations of features mentioned in the description of the figures and/or shown in the figures may be encompassed by the disclosure not only in the combination respectively specified, but also in other combinations. In particular, the disclosure also encompasses embodiments and combinations of features which do not comprise all the features of an originally formulated claim. Furthermore, the disclosure encompasses embodiments and combinations of features which go beyond or deviate from the combinations of features set out.

The disclosure also encompasses the combinations of the features of the described embodiments.

In the exemplary embodiments, the described components each constitute individual features of the disclosure that should be considered independently of one another, that each also develop the disclosure independently of one another and that should thus also be considered to be part of the disclosure individually or in a combination other than that shown. Furthermore, the described exemplary embodiments may also be supplemented by more of the features of the disclosure that have already been described.

In the figures, functionally identical elements are each provided with the same reference signs.

FIG. 1 schematically shows a transportation vehicle 1 comprising an exemplary embodiment of a detection system 2 for detecting at least one intersection point 11a, 11b, 11c, 11d, 12a, 12b, 12c. 12d (see FIG. 5 and FIG. 6) of road marking lines 5, 6a, 6b, 6c, 6d.

The detection system 2 contains a camera system 3 and also a computing unit 4 connected to the camera system 3.

Figure 2:
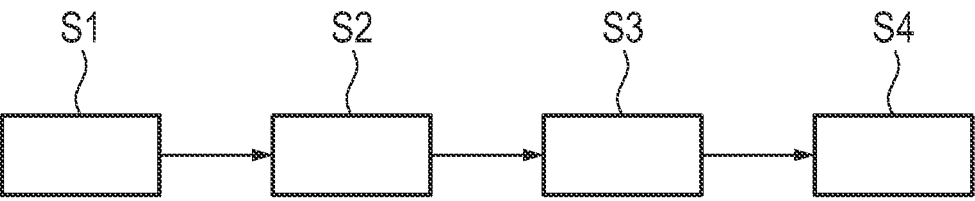
FIG. 2 shows a schematic flow diagram of an exemplary embodiment of a disclosed method for detecting at least one intersection point of road marking lines.

The detection system 2 is configured to carry out a disclosed method for detecting at least one intersection point 11a, 11b, 11c, 11d, 12a, 12b, 12c, 12d of road marking lines 5, 6a, 6b, 6c, 6d. A schematic flow diagram of such a method is illustrated in FIG. 2.

Figure 3:
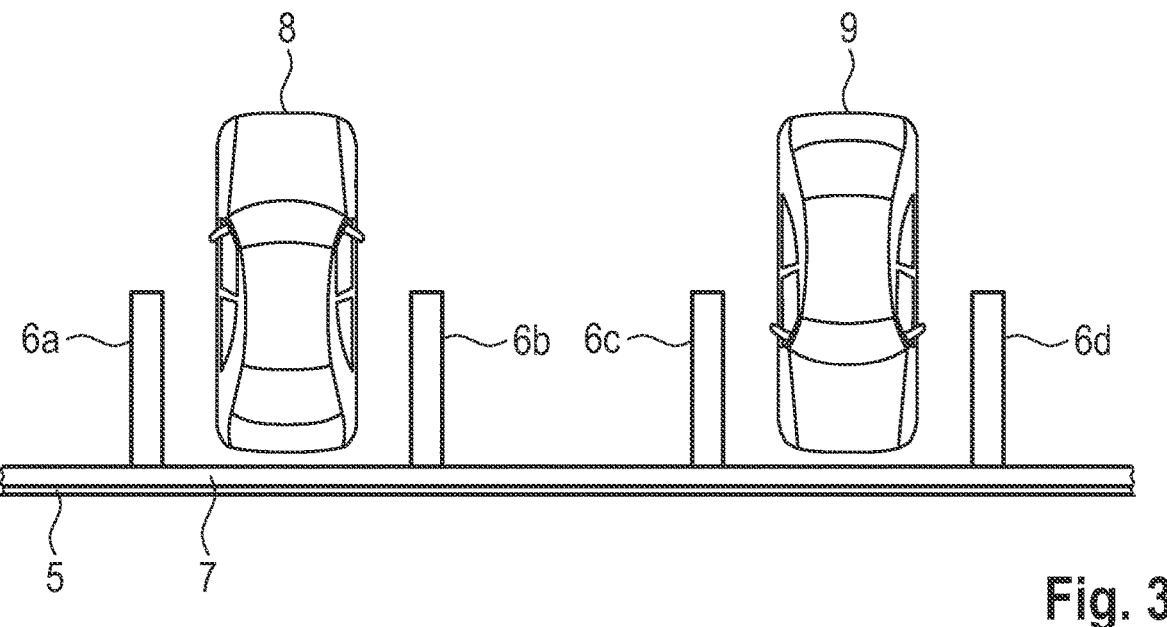
FIG. 3 shows a schematic visualization of an action of the method of FIG. 2.

In operation at S1 of the method, the computing unit 4 receives from the camera system 3 a camera image which depicts a road surface in the environment of the transportation vehicle 1 and, in particular, depicts a first road marking line 5 and also at least one second road marking line 6a, 6b, 6c, 6d, as illustrated schematically in FIG. 3.

The example in FIG. 3 shows in an exemplary manner four second road marking lines 6a, 6b, 6c, 6d arranged parallel to one another, and also a first road marking line 5 running perpendicularly to the four second road marking lines 6a, 6b, 6c, 6d and intersecting them As a result, corresponding parking spaces are defined between respectively adjacent second road marking lines 6a, 6b, 6c, 6d, with further transportation vehicles 8, 9 being positioned in the parking spaces, for example.

Likewise in operation at S1, the computing unit 4 identifies the first road marking line 5 on the basis of the camera image by applying a line recognition algorithm, for example, a RANSAC algorithm or a Hough transformation algorithm. A result of the line recognition algorithm is represented schematically in FIG. 3 as a line 7 running parallel to the road marking line 5. Optionally, further minimum requirements, for example, concerning a length or a color, can be imposed on the first road marking line 5.

Figure 4:
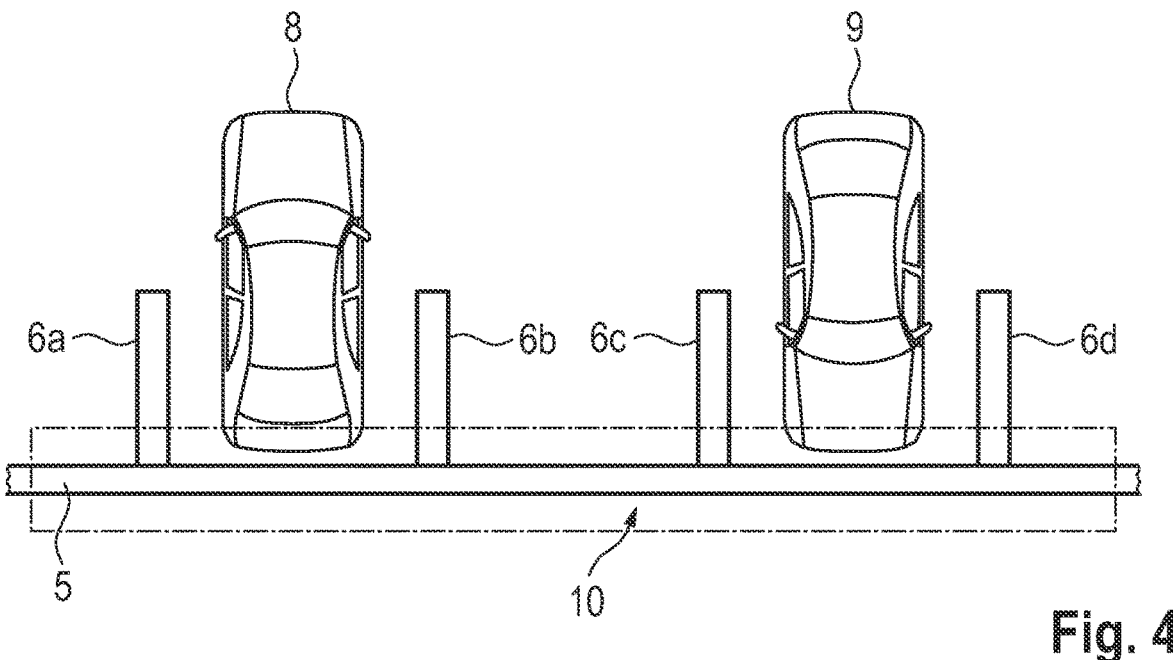
FIG. 4 shows a schematic visualization of a further action of the method of FIG. 2.

In operation at S2, the computing unit 4 automatically determines a search region 10 in a predefined environment of the first road marking line 5 or of the corresponding line 7, as is illustrated schematically in FIG. 4. To determine the search region 10, the computing unit 4 can define, for example, a rectangle or some other geometric figure around the first road marking line 5. In this case, for example, the extent can be predefined perpendicularly to the course of the first road marking line 5.

In operation at S3, the computing unit 4 carries out an automatic search restricted to the search region 10 to identify one or more intersection points 11a, 11b, 11c, 11d, 12a, 12b, 12c, 12d of the first road marking line 5 with the second road marking lines 6a, 6b, 6c, 6d. For this purpose, the computing unit can apply a feature recognition algorithm, for example, a corner recognition algorithm, to the search region 10. As the result of the feature recognition algorithm, besides actual intersection points 11a, 11b, 11c, 11d, 12a, 12b, 12c, 12d of the first road marking line 5 with the second road marking lines 6a, 6b, 6c, 6d, the computing unit 4 may possibly also obtain false positive detections, i.e., as it were false intersection points 13a, 13b, 13d.

Figure 5:
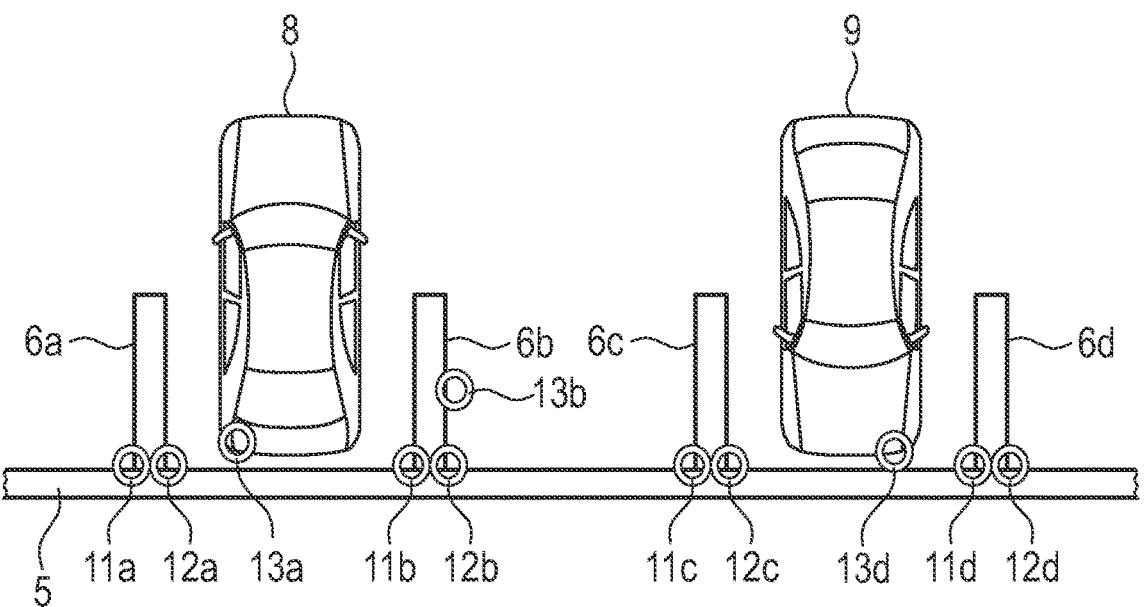
FIG. 5 shows a schematic visualization of a further action of the method of FIG. 2.
Figure 6:
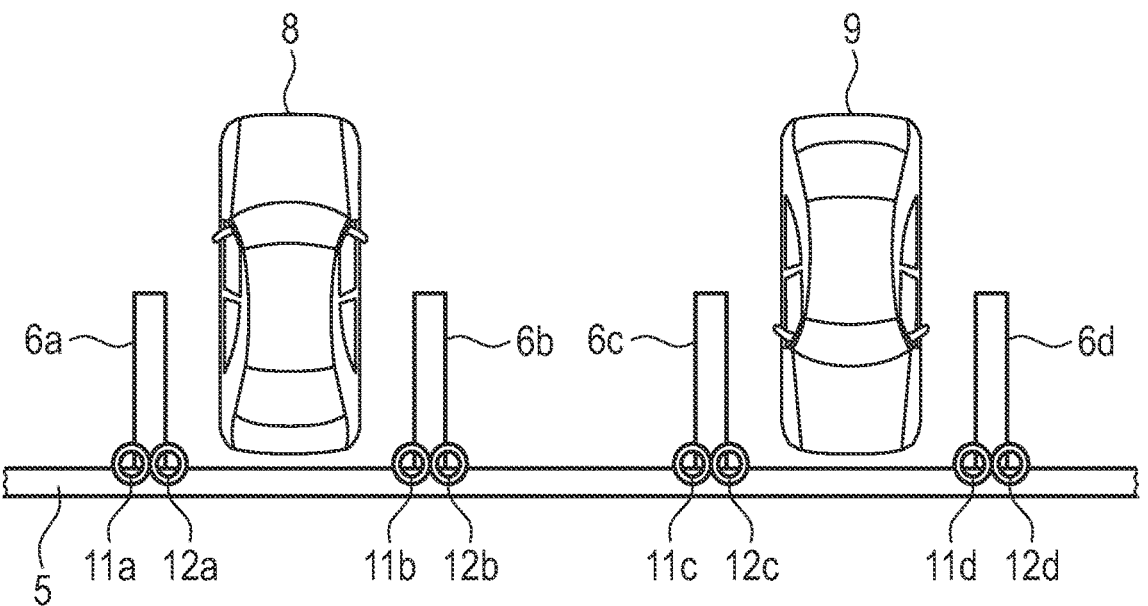
FIG. 6 shows a schematic visualization of a further action of the method of FIG. 2.

In various disclosed embodiments, the computing unit 4 can therefore carry out, in the optional operation at S4, a filtering of the results of the feature recognition algorithm to discard the false intersection points 13a, 13b, 13d, such that only the actual intersection points 11a, 11b, 11c, 11d, 12a, 12b, 12c, 12d result as the final result, as illustrated schematically in FIG. 5 and FIG. 6. The filtering can be carried out, for example, by the use of context knowledge, for example, a width of the road marking lines 5, 6a, 6b, 6c, 6d and thus an expected distance between adjacent intersection points.

As explained above, in particular, in relation to the figures, the disclosed embodiments specify a robust possibility for detecting intersection points of road marking lines with little computational complexity, which can accordingly be used well for real-time applications in embedded systems, in particular, in the self-localization of transportation vehicles, for instance, in the context of automatic or partially automatic driving or parking functions.

The disclosure makes use of the concept of a multistage detector. In various disclosed embodiments, after corresponding image preprocessing, for example, masking, equalization, and so on, it is possible to search for lines in the camera image. Lines which comply with certain minimum requirements, for example, with regard to their length or color, are used as a support for the point search in the second stage of the detector. Image excerpts in which no lines were found can be masked. In the environment of the lines, it is then possible to search for corners or features, for example, by applying a Harris detector algorithm. With the aid of digital map data, the potential intersection points thus found can, for example, be validated further, for example, by way of a distance between the points or an angular position of the points in relation to the line found beforehand.

By virtue of the use of a line detector for delimiting the search space and the additional use of a feature detector for determining the intersection points, it is possible to dispense with the geometric calculation of intersection points of the lines. Instead, the intersection points are detected directly as points. Masking the image outside the search region accelerates the performance of the point search. Moreover, in corresponding disclosed embodiments, false positive detections can be effectively reduced. In accordance with the disclosed method, even lines parallel to the transportation vehicle can be detected well at higher speeds despite motion blur.

LIST OF REFERENCE SIGNS

1 Transportation vehicle
2 Detection system
3 Camera system
4 Computing unit
5 Road marking line
6a, 6b, 6c, 6d Road marking lines
7 Line
8, 9 Transportation vehicles
10 Search region
11a, 11b, 11c, 11d Intersection points
12a, 12b, 12c, 12d Intersection points
13a, 13b, 13d False intersection points

The invention claimed is:

1. A method for detecting at least one intersection point of road marking lines, wherein, by use of a computing unit of a transportation vehicle, the method comprising:
receiving at least one camera image depicting a road surface in an environment of the transportation vehicle from a camera system of the transportation vehicle;
identifying a first road marking line within the at least one camera image by use of the computing unit to cluster lines within the at least one camera image based on line orientation to form the first road marking line;
automatically determining a search region in a predefined environment of the identified first road marking line, wherein the search region is determined using predefined rules for constructing the search region that determine position, orientation and size of the constructed search region that is specific to the identified first road marking line; and
use of the computing unit to perform an automatic search restricted to the constructed search region to identify at least one intersection point of the first road marking line with at least one second road marking line in the constructed search region specific to the identified first road marking line to identify intersecting road marking lines that are related and intersect to signify an area of the road surface in the environment of the transportation vehicle.

2. The method of claim 1, wherein a line recognition algorithm for recognizing lines is applied to image data based on the at least one camera image to identify the first road marking line.

3. The method of claim 2, wherein the line recognition algorithm includes a random sample consensus algorithm and/or a Hough transformation algorithm.

4. The method of claim 1, wherein, for carrying out the automatic search, a feature recognition algorithm for recognizing corners and/or for recognizing other predefined characteristic intersection point descriptors is applied to the search region.

5. The method of claim 4, wherein the feature recognition algorithm includes a Harris detector algorithm.

6. The method of claim 1, further comprising:
identifying a plurality of potential intersection points of the first road marking line with the at least one second road marking line as a result of the automatic search;
selecting the at least one intersection point of the first road marking line from the plurality of potential intersection points based on at least one predefined rule.

7. The method of claim 6, wherein the at least one predefined rule contains a first rule concerning a target distance between two of the plurality of potential intersection points.

8. The method of claim 6, wherein the at least one predefined rule contains a second rule concerning an angle formed between the first road marking line and a straight line connecting two of the plurality of potential intersection points to one another.

9. A method for self-localization of a transportation vehicle, the method comprising:
generating at least one camera image depicting a road surface in an environment of the transportation vehicle by a camera system of the motor transportation vehicle;
use of a computing unit of the transportation vehicle, to perform the method of claim 1 to detect the at least one intersection point of the road marking lines on the road surface; and
use of the computing unit to compare the at least one intersection point of the first road marking line with a predefined digital map and to determine a position of the transportation vehicle in a predefined reference coordinate system based on a result of the comparison.

10. A method for at least partially automatic control of a transportation vehicle, the method comprising:
performing the method for the self-localization of the transportation vehicle of claim 9; and
generating at least one control signal for the at least partially automatic control of the transportation vehicle based on the position of the transportation vehicle in the predefined reference coordinate system.

11. A non-transitory computer readable medium including a computer program product comprising instructions which, when executed by a computer system, cause the computer system to perform the method of claim 1.

12. A detection system for a transportation vehicle for detecting at least one intersection point of road marking lines, the detection system comprising:

a camera system configured to generate at least one camera image depicting a road surface in an environment of the transportation vehicle; and a computing unit configured to identify a first road marking line within the at least one camera image to cluster lines within the at least one camera image based on line orientation to form the first road marking line;

wherein the computing unit is further configured to:

automatically determine a search region in a predefined environment of the identified first road marking line, wherein the search region is determined using predefined rules for constructing the search region that determine position, orientation and size of the constructed search region that is specific to the identified first road marking line; and perform an automatic search restricted to the constructed search region, and identify at least one intersection point of the first road marking line with at least one second road marking line in the constructed search region specific to the identified first road marking line to identify intersecting road marking lines that are related and intersect to signify an area of the road surface in the environment of the transportation vehicle as the result of the search.

13. The detection system of claim 12, wherein the computing unit is configured to compare the at least one intersection point of the first road marking line with a predefined digital map and determines a position of the transportation vehicle in a predefined reference coordinate system based on a result of the comparison.

14. An electronic vehicle control system for a transportation vehicle, the electronic vehicle control system comprising:

the detection system of claim 13; and a control unit configured to generate at least one control signal for at least partial control of the transportation vehicle depending based on the position of the transportation vehicle in the predefined reference coordinate system.

15. A transportation vehicle comprising the electronic vehicle control system of claim 14.

16. The detection system of claim 12, wherein, for identifying the first road marking line, a line recognition algorithm for recognizing lines is applied to image data based on the at least one camera image.

17. The detection system of claim 16, wherein the line recognition algorithm includes a random sample consensus algorithm and/or a Hough transformation algorithm.

18. The detection system of claim 12, wherein, for carrying out the automatic search, a feature recognition algorithm for recognizing corners and/or for recognizing other predefined characteristic intersection point descriptors is applied to the search region.

19. The detection system of claim 18, wherein the feature recognition algorithm includes a Harris detector algorithm.

20. The detection system of claim 12, wherein:

a plurality of potential intersection points of the first road marking line with the at least one second road marking line are identified as the result of the search;

the at least one intersection point of the first road marking line is selected from the plurality of potential intersection points based on at least one predefined rule.

21. The detection system of claim 20, wherein the at least one predefined rule contains a first rule concerning a target distance between two of the plurality of potential intersection points.

22. The detection system of claim 20, wherein the at least one predefined rule contains a second rule concerning an angle formed between the first road marking line and a straight line connecting two of the plurality of potential intersection points to one another.

* * * * *